(12) United States Patent
Min et al.

(10) Patent No.: US 10,192,473 B2
(45) Date of Patent: Jan. 29, 2019

(54) DISPLAY APPARATUS AND METHOD FOR IMAGE PROCESSING

(71) Applicant: SAMSUNG ELECTRONICS CO., LTD., Suwon-si (KR)

(72) Inventors: Byung-seok Min, Seoul (KR); Chun Zhao, Suwon-si (KR); Young-su Moon, Seoul (KR); Ho-cheon Wey, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/624,059

(22) Filed: Jun. 15, 2017

(65) Prior Publication Data

US 2018/0025682 A1  Jan. 25, 2018

(30) Foreign Application Priority Data

Jul. 20, 2016 (KR) .................. 10-2016-0091967

(51) Int. Cl.
| | |
|---|---|
| *G09G 5/00* | (2006.01) |
| *G06T 5/40* | (2006.01) |
| *G09G 3/20* | (2006.01) |
| *G06T 7/90* | (2017.01) |
| *G09G 5/02* | (2006.01) |

(52) U.S. Cl.
CPC .............. *G09G 3/2003* (2013.01); *G06T 5/40* (2013.01); *G06T 7/90* (2017.01); *G09G 5/00* (2013.01); *G09G 5/026* (2013.01); *G06T 2207/10024* (2013.01); *G09G 2320/0242* (2013.01); *G09G 2320/0666* (2013.01); *G09G 2340/06* (2013.01); *G09G 2354/00* (2013.01); *G09G 2370/12* (2013.01); *G09G 2370/16* (2013.01)

(58) Field of Classification Search
CPC .................. G09G 5/02; G06T 11/001
USPC .......................................... 345/589
See application file for complete search history.

(56) References Cited

U.S. PATENT DOCUMENTS

| | | | |
|---|---|---|---|
| 6,377,702 B1 | 4/2002 | Cooper | |
| 7,612,782 B2 | 11/2009 | Kurumisawa et al. | |
| 8,958,640 B1 * | 2/2015 | McNerney | H04N 9/73 382/167 |

(Continued)

FOREIGN PATENT DOCUMENTS

| | | |
|---|---|---|
| JP | 2000-134487 A | 5/2000 |
| JP | 2004-509486 A | 3/2004 |

(Continued)

OTHER PUBLICATIONS

F. Gasparini and R. Schettini, "Color Balancing of Digital Photos Using Simple Image Statistics," Pattern Recognition, vol. 37, No. 6, pp. 1201-1217, 2004.*

(Continued)

*Primary Examiner* — Jin Ge
(74) *Attorney, Agent, or Firm* — Sughrue Mion, PLLC

(57) ABSTRACT

A display apparatus for image processing and a method thereof are disclosed. The image processing method of a display apparatus includes receiving an image frame, identifying color where color cast is present by analyzing at least one of an illumination element and a tint element of the received image frame, and correcting color where the color cast is present by using color distribution of the received image frame.

16 Claims, 10 Drawing Sheets

(56) References Cited

U.S. PATENT DOCUMENTS

| | | | |
|---|---|---|---|
| 2002/0131635 A1* | 9/2002 | Cooper | H04N 1/6027 382/167 |
| 2005/0008222 A1* | 1/2005 | Gallina | H04N 1/608 382/162 |
| 2005/0286097 A1* | 12/2005 | Hung | H04N 1/608 358/509 |
| 2010/0128981 A1* | 5/2010 | Kurumisawa | H04N 1/4074 382/167 |
| 2011/0115811 A1 | 5/2011 | Zhang et al. | |
| 2011/0164150 A1* | 7/2011 | Hong | H04N 5/2354 348/234 |
| 2012/0206475 A1* | 8/2012 | Bryant | G11B 27/034 345/589 |
| 2012/0210229 A1* | 8/2012 | Bryant | H04N 9/73 715/723 |
| 2015/0109356 A1 | 4/2015 | Yata et al. | |
| 2015/0110396 A1* | 4/2015 | Johnson | H04N 1/6077 382/167 |
| 2015/0237320 A1 | 8/2015 | Takahashi et al. | |
| 2015/0281523 A1 | 10/2015 | Higgins | |

FOREIGN PATENT DOCUMENTS

| | | |
|---|---|---|
| JP | 4661659 B2 | 3/2011 |
| KR | 10-2011-0013484 A | 2/2011 |
| KR | 10-2013-0033629 A | 4/2013 |
| KR | 10-2015-0046758 A | 4/2015 |
| KR | 10-2015-0098566 A | 8/2015 |
| KR | 10-2015-0112754 A | 10/2015 |

OTHER PUBLICATIONS

T. Cooper, Color segmentation as an aidto white balancing for digital still cameras, Proc. SPIE 4300 (2001) 164-171.*

F. Gasparini, R. Schettini, P.Gallina, "An Innovative Algorithm for Cast Detection", Proc. SPIE, vol. 4672, pp. 280-286, 2002.*

F. Li, H. Jin, An approach of detecting image color cast based on image semantic, in Proc. of IEEE Conf.: Machine Learning and Cybernetics, pp. 3932-3936, 2004.*

Sheng-Fuu Lin, et al., "Color Casts Detection and Adjustment", IJCSI International Journal of Computer Science Issues, vol. 8, Issue 4, No. 2, Jul. 2011, pp. 13-20.

* cited by examiner

DISPLAY APPARATUS AND METHOD FOR IMAGE PROCESSING

CROSS-REFERENCE TO RELATED APPLICATIONS

This application claims priority from Korean Patent Application No. 10-2016-0091967, filed on Jul. 20, 2016, in the Korean Intellectual Property Office, the disclosure of which is incorporated herein by reference in its entirety.

BACKGROUND

1. Field

Apparatuses and methods consistent with exemplary embodiments relate to a display apparatus for image processing and a method thereof, and more particularly, to an apparatus for performing image processing with respect to an image content where color mastering is executed and a method thereof.

2. Description of the Related Art

In general, a photographing apparatus such as a camera corrects color of an image which is distorted by color temperature of an illumination by surrounding environments by using white balancing technology when photographing an image. In other words, a photographing apparatus may photograph an image having intrinsic color by correcting white of an entire image by using white balancing technology.

However, when correcting a content image where color mastering such as tint treatment is conducted, by using the white balancing technology, the image can be correcting to a content image which is not suit for the intent of a manufacturer.

In addition, when performing image enhancement process of a content image where color mastering is done within a display apparatus, image quality enhancement process for a distorted image can be done in an area where color mastering is done. For the distorted image, when using the correction technology such as white balancing, there is a limitation to applying a correction scope for the distorted image or applying correction-related technologies for a distorted image.

SUMMARY

Exemplary embodiments may overcome the above disadvantages and other disadvantages not described above. However, it is understood that the exemplary embodiments are not required to overcome the disadvantages described above, and may not overcome any of the problems described above.

The present disclosure is designed to solve the above problem and respond to a request for technology development and is purposed to enhance color distribution which occurs when enhancing image quality with respect to an image which is color mastered.

According to an aspect of exemplary embodiments, an image processing method of a display apparatus according to an exemplary embodiment includes receiving an image frame, identifying color where color cast is present by analyzing at least one of an illumination element and a tint element of the received image frame; and correcting color where the color cast is present by using color distribution of the received image frame.

The identifying color where color cast is present may include identifying whether a graphic is included in the received image frame; and in response to the graphic being included in the image frame, identifying a color where the color cast is present using a remaining area excluding an area where the graphic is included.

The identifying color where the color cast is present may include classifying the received image frame into a plurality of areas and identifying color where the color cast is present with respect to at least one area from among the plurality of areas.

The method may further include performing image quality enhancement with respect to the received image frame; and determining whether to correct color where the color cast is present based on casting intensity of the received image frame and casting intensity of the image frame with the enhanced image quality, wherein the correcting may include correcting color where the color cast is present using color distribution of the received image frame and color distribution of the image frame with enhanced image quality.

The casting intensity of color where the color cast is present within the received image frame may be computed using at least one of an illumination element and a tint element of the received image frame, and wherein the casting intensity of the color where color cast is present within the image frame with the enhanced image quality may be computed using at least one of an illumination element and a tint element of the image frame with enhanced image quality.

The determining whether to correct color where the color cast is present may include, in response to the casting intensity of the received image frame being less than a first threshold value or greater than a second threshold value, or the casting intensity of the image frame with the enhanced image quality being less than a third threshold value or greater than a fourth threshold value, determining not to perform correction of color where the color cast is present.

The identifying whether to correct color where the color cast is present may include, in response to an estimated size of an illumination element from the received image frame being less than a predetermined first threshold value, identifying not to perform correction of color where the color cast is present.

The color distribution of the received image frame and color distribution of the image frame with the enhanced image quality may be composed of a two-dimensional histogram that indicates distribution of each color forming the received image frame and the image frame with the enhanced image quality.

The correcting may include, obtaining a first saturation level for the color where color cast is present within the received image frame and a second saturation level for the color where color cast is present within the received image frame with enhanced image quality, with reference to each of the histogram; calculates a weighted value using a difference between the obtained first saturation level and the obtained second saturation level; and correcting the color where color cast is present within the image frame with enhanced image quality using the calculated weighted value.

According to still another exemplary embodiment, a display apparatus includes an image inputter configured to receive an image frame; an outputter configured to output an image content with respect to the image frame; and a processor configured to, in response to the image frame being input, identify color where color cast is present by analyzing at least one of an illumination element and a tint element of the received image frame, and correct the color where color cast is present by using color distribution of the received image frame and color distribution of the image frame with enhanced image quality.

The processor may identify whether a graphic is included in the received image frame, and, in response to the graphic being included in the image frame, identify a color where the color cast is present using a remaining area excluding an area where the graphic is included.

The processor may classify the received image frame into a plurality of areas and identify color where color cast is present with respect to at least one area from among the plurality of areas.

The processor may perform image quality enhancement with respect to the received image frame according to a user command, determine whether to correct color where color cast is present based on casting intensity of the received image frame and the image frame with enhanced image quality, and correct the color where color cast is present using color distribution of the received image frame and color distribution of the image frame with enhanced image quality.

The processor may calculate casting intensity of color where color cast is present within the received image frame using at least one of an illumination element and a tint element of the received image frame, and calculate casting intensity of the color where color cast is present within the image frame with enhanced image quality using at least one of an illumination element and a tint element of the image frame with enhanced image quality.

The processor, in response in response to the casting intensity of the received image frame being less than a first threshold value or greater than a second threshold value, or the casting intensity of the image frame with the enhanced image quality being less than a third threshold value or greater than a fourth threshold value, may determine not to correct the color where color cast is present.

The processor may determine, in response to an estimated size of an illumination element from the received image frame being less than a predetermined first threshold value, not to perform correction of color where the color cast is present.

Color distribution of the received image frame and color distribution of the image frame with the enhanced image quality may be composed of a two-dimensional histogram that indicates distribution of each color forming the received image frame and the image frame with the enhanced image quality.

The processor may obtain a first saturation level for the color where color cast is present within the received image frame and a second saturation level for the color where color cast is present within the received image frame with enhanced image quality, with reference to each of the histogram, calculate a weighted value using a difference between the obtained first saturation level and the obtained second saturation level, and correct the color where color cast is present within the image frame with enhanced image quality using the calculated weighted value.

According to various exemplary embodiments, a display apparatus may provide an image with enhanced image quality more naturally by correcting color distribution which occurs when enhancing image quality with respect to an image with color mastered.

BRIEF DESCRIPTION OF THE DRAWINGS

The above and/or other aspects will be more apparent by describing in detail exemplary embodiments with reference to the accompanying drawings, in which.

DETAILED DESCRIPTION OF THE EXEMPLARY EMBODIMENTS

Figure 1:
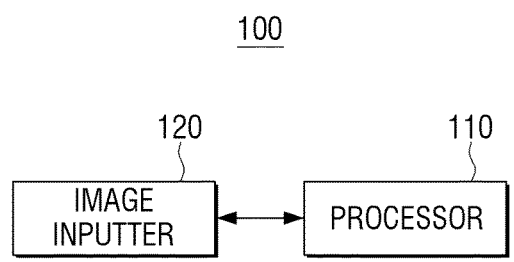
FIG. 1 is a schematic block diagram of a display apparatus which performs image processing according to an exemplary embodiment.

In the following description, the same reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

The example embodiments of the present disclosure may have a variety of modifications and several examples. Accordingly, while various example embodiments are described in detail herein, these are not intended to limit the scope of the present disclosure to the particular example embodiments only. Rather, it should be understood that the example embodiments encompass all the modifications, equivalents or replacements that fall under the concept and technology scope as disclosed. In describing the example embodiments, well-known functions or constructions may not be described in detail when they obscure the disclosure with unnecessary detail. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

Hereinafter, exemplary embodiments will be described in more detail with reference to the accompanying drawings.

FIG. 1 is a schematic block diagram of a display apparatus which performs image processing according to an exemplary embodiment.

As illustrated in FIG. 1, a display apparatus 100 may include a processor 110 and an image inputter 120.

The processor 110 controls operations of each configuration of the display apparatus 100 in overall, and the image inputter 120 receives an image frame which forms an image content generated from an external server (not shown), an image content stored in the display apparatus 100, or an image content stored in an external storage medium physically connected to the display apparatus 100. Herein, the image content may be a content which is image processed by a content provider.

When an image frame forming the above image content is received, the processor 110 may analyze at least one of an illumination element and a tint element of the received image frame and identifies whether color cast is present in the image frame. Here, the color cast may be a phenomenon that a specific color is combined to an image by a developer of a specific image, or natural color forming an image is distorted by color temperature of illumination.

When it is identified that color cast is present in the received image frame, the processor 110 may identify color where color cast is present in the received image frame and correct color where the color cast is present.

In the meantime, ahead of correcting color where the color cast is present in the received image frame, a user command for enhancing image quality with respect to the received image frame can be input. When such user command is input, the processor 110 performs image quality enhancement process with respect to the received image frame. Here, image quality enhancement may indicate image quality enhancement by performing image processing such as enhancement of sharpness, color correction, and noise removal of the received image frame.

When image quality enhancement for the received image frame is performed, the processor 110 may correct color where the color cast is present using color distribution of the received image frame and color distribution of the image frame with enhanced image quality.

Here, the color distribution of the received image frame and color distribution of the image frame with enhanced image quality may be formed as a 2D histogram that indicates distribution of each color forming the received image frame and image frame with enhanced image quality.

Accordingly, the processor 110, when image quality enhancement is performed from the received image frame, by comparing a 2D histogram of each color forming the received image frame and a 2D histogram of each color forming an image frame with enhanced image quality, may correct color where color cast is present.

To be specific, the processor 110, by referring to a 2D histogram which respectively corresponds to the received image frame and the image frame with enhanced image quality, obtains first saturation level with respect to color where color cast is present within the received image frame and second saturation level with respect to color where color cast is present within the image frame with the enhanced image quality.

Then, the processor 110 may calculate a weighted value using a difference between the obtained first saturation level and the obtained second saturation level, and correct color where color cast is present in the image frame with enhanced image quality using the calculated weighted value. That is, the processor 110 may calculate a weighted value using the difference between the obtained first saturation level and the obtained second saturation level and reduce color saturation of color where color cast is present in the image frame with enhanced image quality using the calculated weighted value.

Accordingly, the display apparatus 100, with respect to the image including color cast, may reduce intensity of color where color cast included in the image is present and display it on a screen.

In the meantime, the processor 110, ahead of identifying color where color cast is present in the received image frame, may identify whether a graphic is included in the received image frame. As a result, if it is identified that the graphic is included in the received image frame, the processor 110 may identify color where color cast is present using a remaining area excluding an area where the graphic is included in the received image frame.

According to an additional aspect of the present disclosure, the processor 110 may divide the received image frame into a plurality of areas, analyze at least one of an illumination element and a tint element for the divided plurality of areas, and identify color where color cast is present with respect to the at least one area from among a plurality of areas.

However, the present disclosure is not limited thereto and the processor 110, if there is color cast for at least one area from among a plurality of areas from the received image frame, may not perform correction of color where the color cast is present from the received image frame.

In the meantime, as described above, when the image frame with enhanced image quality is generated from received image frame, the processor 110, ahead of correcting color where the color cast is present, identifies whether to correct color where color cast is present based on casting intensity of the received image frame and casting intensity of the image frame with enhanced image quality.

To be specific, the processor 110 calculates casting intensity of color where color cast is present within the received image frame using at least one of the illumination element and the tint element of the received image frame. In addition, the processor 110, by using at least one of an illumination element and a tint element of the image frame with enhanced image quality, calculates casting intensity of color where color cast is present in the image frame with enhanced image quality.

As such, when casting intensity of color where color cast is present in the received image frame and the image frame with the enhanced image quality is calculated, the processor 110 may identify whether to correct color where color cast is present based on casting intensity of color where color cast is present in each of the received image frame and the image frame with the enhanced image quality.

That is, the processor 110, in case of the following conditions, may not perform correction of color where color cast is present.

According to an exemplary embodiment, the processor 110, when the casting intensity of the received image frame is less than a first threshold value or greater than a second threshold value, does not perform correction of color where color cast is present.

According to another exemplary embodiment, the processor 110, when casting intensity of an image frame with enhanced image quality is less than a third threshold value or greater than a fourth threshold value, does not perform correction of color where color cast is present.

Here, the first threshold value may be set to 0.15, the second threshold value may be 0.7, the third threshold value may be 0.2, and the fourth threshold value may be −0.8. However, setting the first to fourth threshold values is merely exemplary and the values may be set differently according to user setting.

In the meantime, the processor 110, when separate image quality enhancement is not performed from the received image frame, may correct color where color cast is present in the image frame based on the predetermined condition.

As described above, the processor 110, by analyzing at least one of the illumination element and the tint element of the received image frame, identifies color where color cast is present within the received image frame. The processor 110 may reduce saturation level of the color where color cast is present to a level which is set by a user and perform correction of color where color cast is present.

At this time, the processor 110, ahead of correcting the color where color cast is present within the received image frame, may compare the casting intensity of the received image frame and a predetermined threshold value and identify whether to perform correction of color where color cast is present in the received image frame.

As described in the previous exemplary embodiment, the processor 110, when it appears that the casting intensity of the received image frame is less than the first threshold value, or casting intensity of the received image frame is greater than the second threshold value, does not perform correction of color where color cast is present within the received image frame.

In the meantime, while correcting color where color cast is present is performed on the received image frame, when a user command to enhance image quality is input, the processor 110 may perform image enhancement for the image frame where color where color cast is present is corrected.

Accordingly, for an image including color cast, the display apparatus 100 may display an image where intensity of color where color cast is present is low and image quality is enhanced.

So far, the configuration of the display apparatus 100 which performs image processing according to the present embodiment is described. Hereinafter, the processor 110 which performs the aforementioned image processing will be described.

Figure 2:
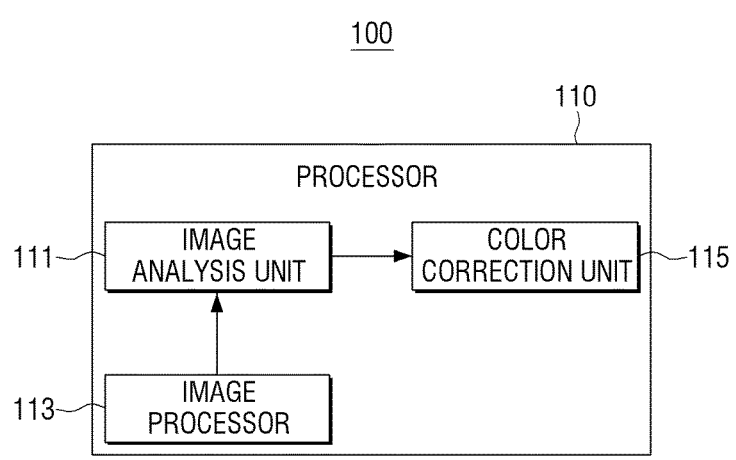
FIG. 2 is a detailed block diagram of a processor which performs image processing according to an exemplary embodiment.

FIG. 2 is a detailed block diagram of a processor which performs image processing according to an exemplary embodiment.

As described in FIG. 2, the processor 110 includes an image analysis unit 111, an image processor 113, and a color correction unit 115.

The image analysis unit 111 identifies whether color cast is present in the received image frame by analyzing the received image frame. As a result, if it is identified that color cast is present in the received image frame, the image analysis unit 111 may identify color where color cast is present in the received image frame and intensity of casting.

In addition, the image analysis unit 111 may extract color distribution of each color forming the received image frame as 2D histogram by analyzing the received image frame.

The image analysis unit 111 identifies whether a graphic image which is the same as a text is included in the image frame by analyzing the received image frame. In this case, if it is identified that a graphic image is included in the received image frame, the image analysis unit 111 may identify whether color cast is present by analyzing a remaining area excluding an area where the graphic image is included in the received image frame.

The image processor 113 performs image quality enhancement process with respect to the received image frame according to a user command. To be specific, with respect to the received image frame, the image processor 113 may enhance image quality by performing image processing such as enhancing sharpness, correcting color, and removing noise.

As such, when image quality enhancement with respect to the received image frame is performed, the image analysis unit 111 may identify color where color cast is present and casting intensity of color where color cast is present from the image frame with enhanced image quality through the aforementioned analysis. In addition, the image analysis unit 111 may extract color distribution with respect to each color forming the image frame with enhanced image quality as a 2D histogram.

However, the present embodiment is not limited thereto, and when image quality enhancement for the received image frame is performed, the image analysis unit 111 may extract a 2D histogram indicating color distribution with respect to each color forming the image frame with enhanced image quality.

Figure 3:
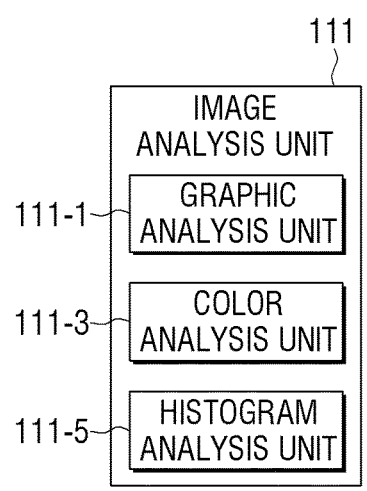
FIG. 3 is a detailed block diagram of an image analysis unit according to an exemplary embodiment.

In the meantime, the aforementioned image analysis unit 111 may include the features as FIG. 3.

FIG. 3 is a detailed block diagram of an image analysis unit according to an exemplary embodiment.

As illustrated in FIG. 3, the image analysis unit 111 may include a graphic analysis unit 111-1, a color analysis unit 111-3, and a histogram analysis unit 111-5.

The graphic analysis unit 111-1 identifies whether a graphic image such as a text is included in the image frame by analyzing the received image frame. According to an exemplary embodiment, the graphic analysis unit 111-1 may identify whether there is a graphic image such as a text within the received image frame using graphic detection algorithm.

For example, when a text image is included in the received image frame, the graphic analysis unit 111-1 may detect a text image within the received image frame using the graphic text detection algorithm or scene text detection algorithm. Here, the graphic text detection algorithm is algorithm to detect a text image which is artificially inserted in the image frame, and can detect a text image in the image frame by using brightness of text image and continuity of each color forming an image frame or the like.

In addition, the scene text detection algorithm is algorithm to detect text which is naturally present in a natural image and a text image can be detected in an image frame using features of brightness of a text image.

The present embodiment is not limited thereto and the graphic analysis unit 111-1 may detect a graphic image inserted in the received image frame using various graphic image detection algorithm.

The color analysis unit 111-3 determines whether color cast is present in the received image frame. Here, the color cast can be a phenomenon that a specific color is combined to an image by a developer of a specific image, or natural color forming an image is distorted by color temperature of illumination.

To be specific, the color analysis unit 111-3 may selectively combine various white balancing algorithm such as gray world or maximum white estimation and determine a ratio value of R, G, and B which corresponds to illumination element (white).

Therefore, the color analysis unit 111-3 may estimate at least one of illumination element and tint element of the received image frame from R, G, B ratio value with respect to the received image frame, and by analyzing at least one of the estimated illumination element and tint element, identify whether color cast is present in the received image frame, and if present, determine color which is present in the color cast.

According to an exemplary embodiment, the color analysis unit 111-3, when color cast is present in the received image frame, may calculate color where color cast is present (Color) and casting intensity through [Equation 1] or [Equation 2].

$$H' = \begin{cases} \text{undefined,} & \text{if } C = 0 \\ \dfrac{G-B}{C} \bmod 6, & \text{if } M = R \\ \dfrac{B-R}{C} + 2, & \text{if } M = G \\ \dfrac{R-G}{C} + 4, & \text{if } M = B \end{cases} \quad \text{(Equation 1)}$$

$H = 60° \times H'$,
where
$M = \max(R, G, B)$
$m = \min(R, G, B)$
$C = M - m$ $$Hue = \tan^{-1}(Cb/Cr) \quad \text{(Equation 2)}$$

To be specific, [Equation 1] is to calculate [ER, EG, EB] which are R, G, B ratio values with respect to the color where color cast is present as color information by color saturation value (HSV) definition, and R, G, B values in [Equation 1] correspond to [ER, EG, EB].

In addition, in [Equation 2], with respect to color where color cast is present, R, G, B ratio values [ER, EG, EB] are changed to YCbCr to calculate color information in YCbCr space. In [Equation 2], with respect to color where color cast is present, Cb/Cr is a value when R, G, B ratio values are converted to YCbCr.

In the meantime, casting intensity with respect to color where color cast is present in the received image frame can be calculated from [Equation 3] or [Equation 4].

$$S_{Tint} = ((\text{Max}(R,G,B) - \text{Min}(R,G,B))/\text{Max}(R,G,B) \quad \text{[Equation 3]}$$

$$S_{Tint}' = \sqrt{(Cb^2 + Cr^2)} \quad \text{[Equation 4]}$$

To be specific, [Equation 3] or [Equation 4] is to calculate level of casting intensity with respect to color where color cast is present using [ER, EG, EB] which are R, G, B ratio values.

The histogram 111-5 analyzes the received image frame and extracts color distribution with respect to each color forming the received image frame as 2D histogram.

Color distribution with respect to each color forming the image frame can be calculated using [Equation 5] or [Equation 6] according to resources of hardware.

$$S_{Hist} = ((\text{Max}(R,G,B) - \text{Min}(R,G,B))/\text{Max}(R,G,B) \quad \text{[Equation 5]}$$

$$S' = \sqrt{(Cb^2 + Cr2)} \quad \text{[Equation 6]}$$

To be specific, [Equation 5] is to extract 2D histogram indicating color distribution by pixels using R, G, B pixel values with respect to each color forming the received image frame. [Equation 6] is to convert R, G, and B pixel values with respect to each color forming the received image frame to YCrCb in order to extract 2D histogram indicating pixel distribution by coordinates in color space.

In the meantime, as described above, the image processor 113 may perform image enhancement with respect to the received image frame according to a user command.

In this case, the color analysis unit 111-3 may identify casting intensity of the color where color cast is present in the image frame with enhanced image quality by performing the aforementioned process.

The histogram analysis unit 111-5 may perform the aforementioned processing and extract color distribution for each color forming the image frame with enhanced image quality as 2D histogram.

However, the present disclosure is not limited thereto, and if image enhancement for the received image frame is performed, only the histogram analysis unit 111-5 out of the color analysis unit 111-3 and the histogram analysis unit 111-5 performs processing and extract color distribution for each color forming the image frame with enhanced image quality as a 2D histogram.

In FIG. 2, the color correction unit 115 performs correction of color where color cast is present in the received image frame. To be specific, the color correction unit 115 may reduce casting intensity of color where color cast is present by reducing saturation level of color where color cast is present in the received image frame.

The color correction unit 115 may perform correction of color where color cast is present based on the following exemplary embodiment.

According to an exemplary embodiment, when correcting color where color cast is present in the received image frame, the color correction unit 115, ahead of correcting color where color cast is present in the received image frame, may identify whether to correct color where color cast is present.

To be specific, the color correction unit 115, in the received image frame which is calculated through the aforementioned color analysis unit 111-3, if casting intensity of color where color cast is present is less than the predetermined first threshold value or greater than the predetermined second threshold value, does not perform correcting color where color cast is present. Here, the first threshold value may be 0.15, and the second threshold value may be 0.7.

For example, when illumination element estimated from the received image frame is close to 0, difference among R, G, and B corresponding to illumination element closes to 0. In this case, color cast is present in the received image frame, but output image of an image frame where color cast is present may be very similar to the output image of an image frame where color cast is not present.

In this case, casting intensity of color where color cast is present in the received image frame is less than the first threshold value, and the color correction unit 115 does not perform correction of color where color cast is present in the received image frame.

As another example, for closing image of an image content such as a movie, specific color can be color casted by a manufacturer. In this case, casting intensity of color where color cast is present in a closing image can be at a very high level.

In this case, casting intensity of color where color cast is present in the received image frame is greater than the second threshold value, and the color correction unit 115 does not perform correction of color where color cast is present in the received image frame.

In the meantime, through the aforementioned comparison analysis, if it seems that correction of color where color cast is present is to be performed, the color correction unit 115 performs correction of color where color cast is present in the received image frame. That is, the color correction unit 115 may perform color correction to reduce casting intensity of color where color cast is present with the casting intensity having the predetermined level.

According to still another exemplary embodiment, when an image frame with the enhanced image quality is generated from the received image frame, the color correction unit 115, ahead of compensating color where color cast is present in the image frame with enhanced image quality, may identify whether to correct color where color cast is present.

As described above, the color analysis unit 111-3 may calculate casting intensity of color where color cast is present in the received image frame. In addition, the color analysis unit 111-3, when an image frame with enhanced image quality is generated from the received image frame through the image processor 113, may calculate color where color cast is present and casting intensity of the color where color cast is present in the image frame with enhanced image quality.

Therefore, the color correction unit 115 may compare casting intensity of color where color cast is present and a predetermined threshold value in at least one image frame from among the received image frame and the image frame with enhanced image quality and determine whether to correct color where color cast is present.

According to an exemplary embodiment, the color correction unit 115, when casting intensity of color where color cast is present in the received image frame is less than the predetermined first threshold value or greater than the predetermined second threshold value, determine not to correct color where color cast is present in the received image frame. Here, the first threshold value may be 0.15, and the second threshold value may be 0.7.

According to still another exemplary embodiment, the color correction unit 115, when casting intensity of color where color cast is present in the received image frame with the enhanced image quality is less than the third threshold value or greater than the predetermined fourth threshold value, determines not to perform correction of color where color cast is present in the image frame with enhanced image quality. Here, the third threshold value may be 0.2, and the fourth threshold value may be −0.8.

That is, the color correction unit 115 may compare casting intensity of color where color cast is present and a predetermined threshold value in at least one image frame from among the received image frame and the image frame with enhanced image quality and determine whether to correct color where color cast is present.

Through the aforementioned comparison analysis, if it is determined that correction of color where color cast is present is to be performed, the color correction unit 115 performs correction of color where color cast is present in the image frame with enhanced image quality.

To be specific, the color correction unit 115, by using 2D histogram indicating color distribution of each color forming the received image frame extracted through the histogram analysis unit 111-5 and 2D histogram indicating color distribution of each color forming the received image with enhanced image quality, may determine a level of casting intensity of color where color cast is present in an image frame with enhanced image quality.

That is, the color correction unit 115 obtains distribution value of color where color cast is present from each image frame through histogram respectively corresponding to the received image frame and the image frame with enhanced image quality. Then, the color correction unit 115 may determine reduction amount of casting intensity to reduce intensity of color where color cast is present in the image frame with enhanced image quality from change amount of distribution value of color where color cast is present in the received image frame and distribution value of color where color cast is present in the received image frame with enhanced image quality. Then, the color correction unit 115 may determine a level for reducing casting intensity of color where color cast is present in the image frame with enhanced image quality based on the determined reduction amount.

The color correction unit 115 may adjust level of casting intensity of color where color cast is present based on the value calculated by [Equation 7] and [Equation 8].

$$Sat_{Weight} = SAT_{ORG}/SAT_{Post} * Weight \qquad \text{[Equation 7]}$$

$$k = f(Hue, Sat.) = Bilinear(H_1S_1, \ldots H_nS_n) \qquad \text{[Equation 8]}$$

To be specific, [Equation 7] illustrates reduction amount to reduce casting intensity of color where color cast is present, and $SAT_{ORG}$ indicates a level of casting intensity with respect to color where color cast is present in the received image frame, and $SAT_{Post}$ indicates a level of casting intensity with respect to color where color cast is present in the image frame with enhanced image quality.

[Equation 8] is for adjusting a level of casting intensity based on casting intensity with respect to color where color cast is present, and specifically, by using the reduction amount (weighted value) as in [Equation 7], a level of casting intensity of color where color cast is present can be adjusted.

Adjustment of a level of casting intensity of color where color cast is present can be determined by using one of [Equation 9] to [Equation 11].

$$[Hoot, Scout, Vought] = [Hein, k*Sin, Vain] \qquad \text{[Equation 9]}$$

$$[Youth, Bout, Croat] = [Iain, k*Cabin, k*Crain] \qquad \text{[Equation 10]}$$

$$[L^*\_out, a^*\_out, b^*\_out] = [L^*\_in, k*a^*\_in, k*b^*\_in] \qquad \text{[Equation 11]}$$

In [Equation 9], a level is adjusted by converting R, G, B to HSV value and multiplying a gain value to S out of the converted HSV value. In [Equation 10], R, G, B values are converted to YCbCr, and from among the converted YCBCr values, a gain value is multiplied with Cb and Cr to adjust a level. Lastly, in [Equation 11], R, G, B values are converted to L*,a*,b* which are independent color values of the display apparatus 100, and after multiplying the same gain values to a*,b* from among the converted L*,a*,b*, the values are converted to R, G, B again.

Therefore, the color correction unit 115, through the various Equations ([Equation 7] to [Equation 11]), may determine a level of casting intensity of color where color cast is present, and perform color correction to reduce casting intensity of color where color cast is present in the image frame with enhanced image quality based on the determined level.

Figure 4:
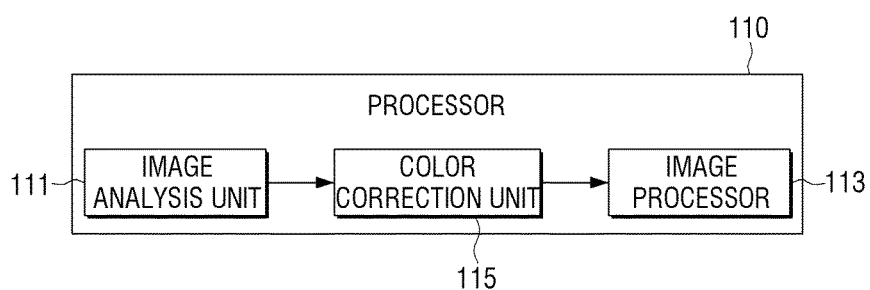
FIG. 4 is a detailed block diagram of a processor which performs image processing according to still another exemplary embodiment.

FIG. 4 is a detailed block diagram of a processor which performs image processing according to still another exemplary embodiment.

The processor 110 in FIG. 4, different from the processor 110 of FIG. 2, can perform image enhancement process for the image frame where color where color cast is present is corrected through the image processor 113 after correcting color where color cast is present in the received image frame through the color correction unit 115.

The processor 110 as illustrated in FIG. 4 may include an image analysis unit 111, an image processor 113, and a color correction unit 115. The image analysis unit 111, the image processor 113, and the color correction unit 115 are described in FIGS. 2-3 and thus will not be further described.

To be specific, the image analysis unit 111, as described above, identifies color where color cast is present in the received image frame by analyzing at least one of the illumination element and tint element. As a result of identification, if color where color cast is present in the received image frame, the image analysis unit 111 detects casting intensity with respect to color where color cast is present in the received image frame.

The color correction unit 115 compares casting intensity of color where color cast is present which is detected through the image analysis unit 111 with the predetermined threshold value and determines whether to correct color where color cast is present. When it is determined to correct color where color cast is present, the color correction unit 115 performs correction of color where color cast is present in the received image frame.

The image processor 113 may perform image enhancement of the image frame where correction of color where color cast is present is performed and output the image frame with enhanced image quality.

Figure 5:
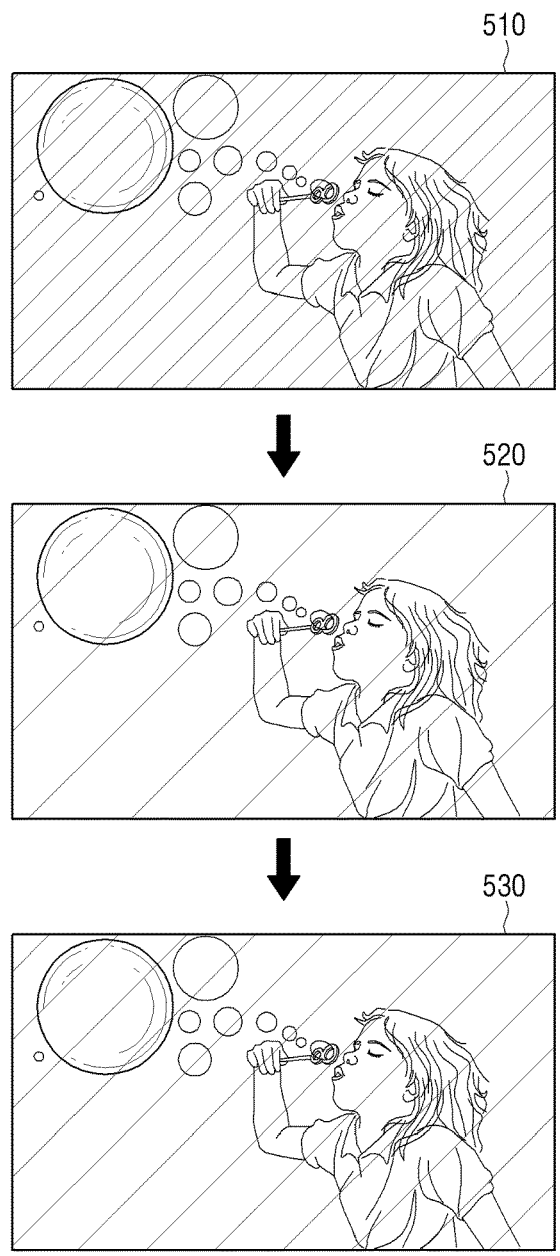
FIG. 5 is a first exemplary view indicating an image processing result with respect to an image frame input from a display apparatus according to an exemplary embodiment.

FIG. 5 is a first exemplary view indicating an image processing result with respect to an image frame input from a display apparatus according to an exemplary embodiment.

As illustrated in FIG. 5, when an image frame 510 including color where color cast is present is input, the processor 110 performs image enhancement of the received image frame 510 through the image processor 113. When the image frame with enhanced image quality is generated, the processor 110 may correct color where color cast is present in the image frame with enhanced image quality 520 and output an image frame 520 where color where color cast is present is corrected.

That is, as illustrated in FIG. 5, when image enhancement for the received image frame 520 is performed, casting intensity of color where color cast is present in the image frame 520 with enhanced image quality can be casting intensity having a higher level than the casting intensity of color where color cast is present.

Therefore, the color correction unit 115 of the processor 110, from 2D histogram of the received image frame 510 and 2D histogram of the received image frame 520 with enhanced image quality, obtains distribution value of color where color cast is present from each image frame 510, 520. The color correction unit 115, from change amount between obtained two distribution values, determines a level to reduce casting intensity of color where color cast is present of the image with enhanced image quality, and corrects color where color cast is present in the image frame with enhanced image quality with the casting intensity corresponding to the determined level.

Accordingly, while casting intensity of color where color cast is present is reduced, an image frame 530 with enhanced image quality is finally generated and can be displayed on a screen.

Figure 6:
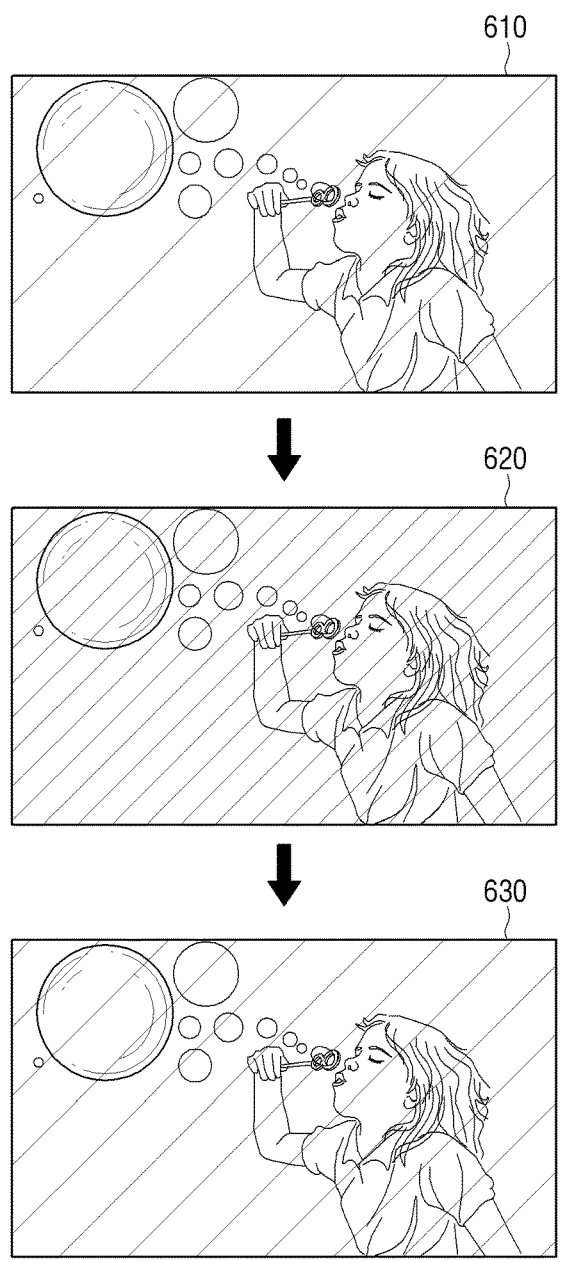
FIG. 6 is a second exemplary view indicating an image processing result with respect to an image frame input from a display apparatus according to still another exemplary embodiment.

FIG. 6 is a second exemplary view indicating an image processing result with respect to an image frame input from a display apparatus according to still another exemplary embodiment.

As illustrated in FIG. 6, when an image frame 610 including color where color cast is present is input, the color correction unit 115 of the processor 110 may reduce casting intensity with respect to color where color cast is present in the received image frame 610 to a predetermined level. Therefore, an image frame 620 where casting intensity of color where color cast is present is reduced can be generated.

The image processor 113 of the processor 110 performs image enhancement from the image frame 620 where casting intensity of color where color cast is present is reduced. Accordingly, while casting intensity of color where color cast is present is being reduced, the image frame 630 with enhanced image quality is finally generated and may be displayed on a screen.

When color cast is present for a part of an area of a plurality of areas forming the received image frame, the processor 110 may identify whether color cast is present through the operations as shown below.

Figure 7:
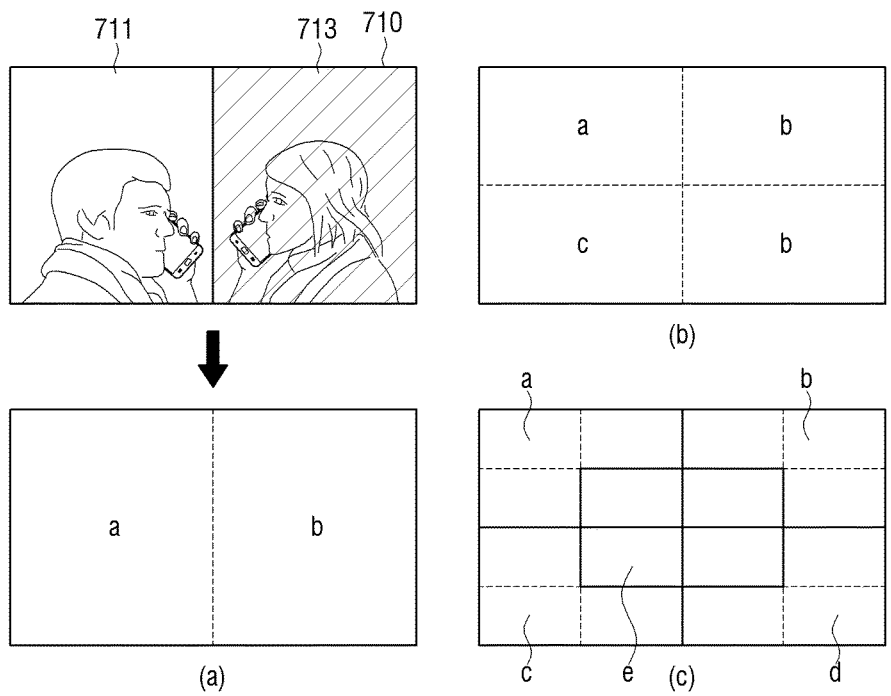
FIG. 7 is an exemplary view determining whether color cast is present in an image frame in a display apparatus according to an exemplary embodiment.

FIG. 7 is an exemplary view determining whether color cast is present in an image frame in a display apparatus according to an exemplary embodiment.

As illustrated in FIG. 7, an image in a first area 711 of a received image frame 710 has no color cast, and an image of a second image area 713 may have color cast.

In this case, the image analysis unit 111 of the processor 110, as illustrated in FIG. 7(a), divides an entire area of the received image frame 710 to area a and area b. The image analysis unit 111, by analyzing at least one of illumination element and tint element from the image of the first area and second area 711, 713 respectively corresponding to area a and area b from among the entire area of the received image frame 710 and detect an area where color cast is present.

The image analysis unit 111, as illustrated in FIG. 7(b), divides an entire area of the received image frame 710 to area a to area d, and by analyzing at least one of illumination element and tint element from the image of the areas respectively corresponding to area a to area d, may detect an area where color cast is present.

The image analysis unit 111, as illustrated in FIG. 7(c), divides an entire area of the received image frame 710 to area a to area e, and by analyzing at least one of illumination element and tint element from the image of the areas respectively corresponding to area a to area e, may detect an area where color cast is present.

As described above, the image analysis unit 111 of the present embodiment may divide the entire area and detect an area where color cast is present by analyzing at least one of illumination element and tint element from images corresponding to each area. Accordingly, the image analysis unit 111, when color cast is present in a part of an area of an image frame, may perform correction of color which corresponds to color cast only for an area where color cast is present.

However, the present disclosure is not limited thereto, and the image analysis unit 111 may divide the entire area of the received image frame diversely and by analyzing at least one of illumination element and tint element from an image corresponding to each area, when at least one area where color cast is present is detected, may not perform separate color correction for the image frame.

In the meantime, the aforementioned display apparatus 100 may be a multimedia apparatus which may output a video such as a smart TV, smartphone, and tablet, or a terminal device which is physically connected to a device which may output an image and provides image content received from an external server (not shown) such as a set-top box.

Figure 8:
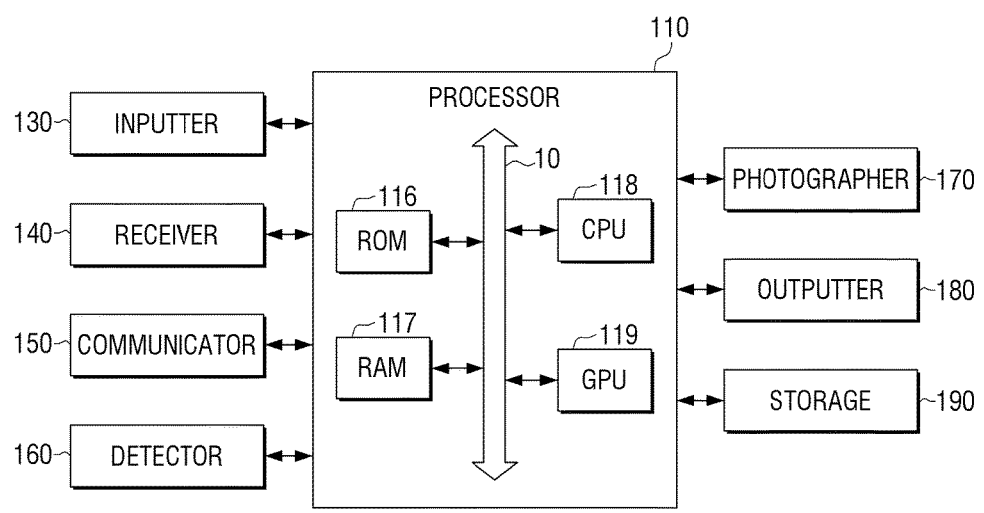
FIG. 8 is a detailed block diagram of a display apparatus according to an exemplary embodiment.

The display apparatus 100 may further include the configurations as FIG. 8.

FIG. 8 is a detailed block diagram of a display apparatus according to an exemplary embodiment.

As described in FIG. 8, the display apparatus 100 may further include an inputter 130, a receiver 140, a communicator 150, a detector 160, a photographer 170, an outputter 180, and a storage 190 in addition to the aforementioned configurations.

The inputter 130, as an input mean to receive various user commands and transmit them to the processor 110, may include the image inputter 120 which receives an image frame as described above. In addition, the inputter 130 may receive a voice command of a user through a microphone (not shown) or a key pad including function keys, number keys, special keys, and character keys. The inputter 130 may receive a user command through a display panel which displays an image and a touch pad which forms a mutual layer structure.

The receiver 140 may receive an IR signal or RF signal for controlling the operations of the display apparatus 100 from at least one peripheral devices (not shown) such as a remote controller.

The communicator 150 performs data communication with at least one user terminal device (not shown). The communicator 150 may include a connector which includes at least one of wireless communication modules such as near field communication module, wireless LAN module, and wired communication modules such as High-Definition Multimedia Interface (HDMI), Universal Serial Bus (USB), Institute of Electrical and Electronics Engineers (IEEE) 1394, etc.

Here, the near field communication module performs near field communication without wire between the display apparatus 100 and nearby user terminal device (not shown). The near field communication module may include at least one of Bluetooth module, infrared data association (IrDA) module, Near Field Communication (NFC) module, WIFI module, and Zigbee module.

In addition, the wireless communication module is a module connected to an external network and performs communication according to wireless communication protocol such as IEEE. The wireless communication module may further include a mobile communication module which accesses to mobile communication network based on various mobile communication specification such as 3rd Generation (3G), 3rd Generation Partnership Project (3GPP), Long Term Evolution (LTE) and perform communication.

As such, the communicator 150 may be embodied by various near field communication methods and employ other communication technologies not mentioned in the specification, if necessary.

In the meantime, a connector is physically connected with various source devices such as USB 2.0, USB 3.0, HDMI, IEEE 1394 and transceives data. The connector may receive content data transmitted from an external server (not shown) through a wire cable connected to a connector according to a control command of the processor 110, or transmit pre-stored content data to an external recording medium. In addition, a connector may receive power from power source through a wired cable physically connected to a connector.

The detector 160 is a configuration to detect a user motion. According to an exemplary embodiment, the detector may include at least one of a pupil tracking sensor which tracks pupil of a user, a motion sensor which detects a motion of the display apparatus 100, a geomagnetic sensor, a gravity sensor, and a gyroscope sensor.

Here, the pupil tracking sensor is located nearby pupil of a user which is a sensor that detects changes in gaze of a user while photographing pupil of a user and a motion sensor may be an accelerometer sensor which measures acceleration or shock intensity of a moving display apparatus 100.

The geomagnetic sensor is an electronic compass which can detect azimuth using magnetic field, which is used for location tracking and 3D video game or for smartphone, a radio, GPS, PDA, navigation device, etc. The gravity sensor is a sensor to detect to which direction gravity is applied that is used for detecting a direction while automatically rotating along with a moving direction of the display apparatus 100.

The gyroscope sensor is a sensor which helps more detailed and delicate operation recognition by recognizing 6-axis rotation by applying rotation to the existing motion sensor.

In the meantime, the detector 160 may further include a proximity sensor (not shown) for determining whether an object approaches before the object is in contact with another object and an optical sensor (not shown) which detects light and converts it to an electrical signal.

The photographer 170 photographs an image with respect to the surrounding environment of the display apparatus 100, and the outputter 180 outputs at least one of audio and video data of an image content which is signal processed through the processor 110. Here, an image content which is signal processed to video data can be an image with enhanced image quality or an image where image quality enhancement or color correction process is performed for color where color cast is present.

The storage 190 may store various image contents or store video and audio data of contents received from an external server. In addition, the storage 190 may further store an operation program to control operations of the display apparatus 100. Here, the operation program may be a program, when the display apparatus 100 is turned on, which is read in the storage 190 and compiled and operates the display apparatus 100.

In the meantime, the processor 110 may further include ROM 116, RAM 117, CPU 118, and GPU 119, and ROM 116, RAM 117, CPU 118, and GPU 119 can be interconnected through bus 10.

The CPU 118, by accessing the storage 190, performs booting using OS stored in the storage 190. In addition, the CPU 118 performs various operations using various programs, contents, and data stored in the storage 190.

The GPU 119 generates a display screen including various objects such as an icon, image, and text. To be specific, the GPU 119, based on a received control command, generates attribute values such as a coordinate value, shape, color, size of objects according to a layout of a screen, and generates display screens of various layouts including objects based on the calculated attribute values.

The ROM 116 stores a command set for system booting. When a turn-on command is input and power is supplied, the CPU 118 copies OS stored in the storage 190 to the RAM 117 according to a command stored in the ROM 116, and executes OS to boot system. When booting is completed, the CPU 118 copies various programs stored in the storage 190 to the RAM 117, executes a program copied to the RAM 117, and performs various operations.

The processor 110 may be combined with the aforementioned element and can be embodied as a system-on-a-chip (or SOC, SoC).

The operations of the processor 110 can be done by a program stored in the storage 190. Here, the storage 190 may be embodied as at least one of the ROM 116, RAM 117, a memory card (ex, SD card, memory stick) detachable to the display apparatus 100, non-volatile memory, volatile memory, hard disc drive (HDD) or solid state drive (SSD).

Each element of the electronic apparatus 100 has been described in detail.

Hereinbelow, a method for performing image processing for an image frame in the display apparatus 100 will be described in detail.

Figure 9:
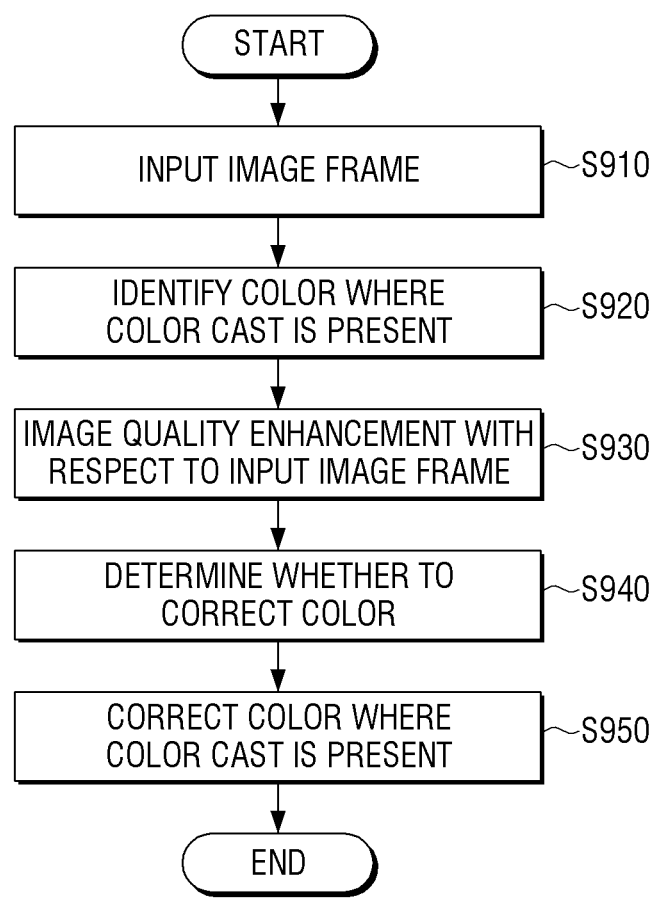
FIG. 9 is a flowchart of a method for performing image processing with respect to an image frame input from a display apparatus according to an exemplary embodiment.

FIG. 9 is a flowchart of a method for performing image processing with respect to an image frame input from a display apparatus according to an exemplary embodiment.

As illustrated in FIG. 9, when an image frame forming the above image content is input, the display apparatus 110 may analyze at least one of illumination element and tint element of the received image frame and identifies whether color cast is present in the image frame (S910, S920).

Here, the color cast may be a phenomenon that a specific color is combined to an image by a developer of a specific image, or natural color forming an image is distorted by color temperature of illumination.

To be specific, the display apparatus 100 may selectively combine various white balancing algorithm such as gray world or maximum white estimation and determine a ratio value of R, G, and B which corresponds to illumination element (white). Then, the display apparatus 100 may estimate at least one of illumination element and tint element of the received image frame from R, G, B ratio value with respect to the received image frame, and by analyzing at least one of the estimated illumination element and tint element, identify whether color cast is present in the received image frame, and if present, determine color which is present in the color cast.

In the meantime, the display apparatus 100, ahead of identifying color where color cast is present in the received image frame, may identify whether graphic is included in the received image frame. As a result, if it is identified that graphic is included in the received image frame, the display apparatus 100 may identify color where color cast is present using a remaining area excluding an area where graphic is included in the received image frame.

The display apparatus 100 may divide the received image frame into a plurality of areas to determine whether color where color cast is present. Then, the display apparatus analyzes at least one of illumination element and tint element for the divided plurality of areas, and identifies color where color cast is present with respect to the at least one area from among a plurality of areas.

However, the present disclosure is not limited thereto and the display apparatus 100, if there is color cast for at least one area from among a plurality of areas from the received image frame, may not perform correction of color where the color cast is present from the received image frame.

When color where color cast is present is identified in the received image frame, the display apparatus 100 performs image enhancement of the received image frame (S930). Here, image enhancement indicates image quality by performing image processing such as enhancing sharpness, correcting color, and removing noise.

Then, the display apparatus 100 identifies whether to correct color where color cast is present (S940).

To be specific, the display apparatus 100 calculates casting intensity of color where color cast is present within the received image frame using at least one of the illumination element and the tint element of the received image frame. In addition, the display apparatus 100, by using at least one of an illumination element and a tint element of the image frame with enhanced image quality, calculates casting intensity of color where color cast is present in the image frame with enhanced image quality.

As such, when casting intensity of color where color cast is present in the received image frame and the image frame with the enhanced image quality is calculated, the display apparatus 100 may identify whether to correct color where color cast is present based on casting intensity of color where color cast is present in each of the received image frame and the image frame with the enhanced image quality.

According to an exemplary embodiment, the display apparatus 100, when the casting intensity of the received image frame is less than the first threshold value or greater than the second threshold value, does not perform correction of color where color cast is present. The display apparatus 100, when casting intensity of an image frame with enhanced image quality is less than the third threshold value or greater than the fourth threshold value, does not perform correction of color where color cast is present.

Here, the first threshold value may be set to 0.15, the second threshold value may be 0.7, the third threshold value may be 0.2, and the fourth threshold value may be −0.8. However, setting the first to fourth threshold values is merely exemplary and the values may be set differently according to user setting.

If it is identified to correct color where color cast is present through the above comparison and analysis, the display apparatus 100 corrects color where color cast is present by using color distribution of the received image frame and color distribution of the image frame with enhanced image quality (S950).

Here, the color distribution of the received image frame may be formed as a 2D histogram that indicates distribution of each color forming the received image frame. The color distribution of the image frame with enhanced image quality may be formed as a 2D histogram that indicates distribution of each color forming the image frame with enhanced image quality in the same manner.

Therefore, the display apparatus 100 obtains distribution value of color where color cast is present from each image frame through histogram respectively corresponding to the received image frame and the image frame with enhanced image quality through 2D histogram. Then, the display apparatus 100 may determine level of casting intensity of color where color cast is present in the image frame with enhanced image quality from change amount of distribution value of color where color cast is present in the received image frame and distribution value of color where color cast is present in the received image frame with enhanced image quality. The display apparatus 100 may perform color correction to reduce casting intensity of color where color cast is present in the image frame with enhanced image quality based on the determined reduction amount.

Figure 10:
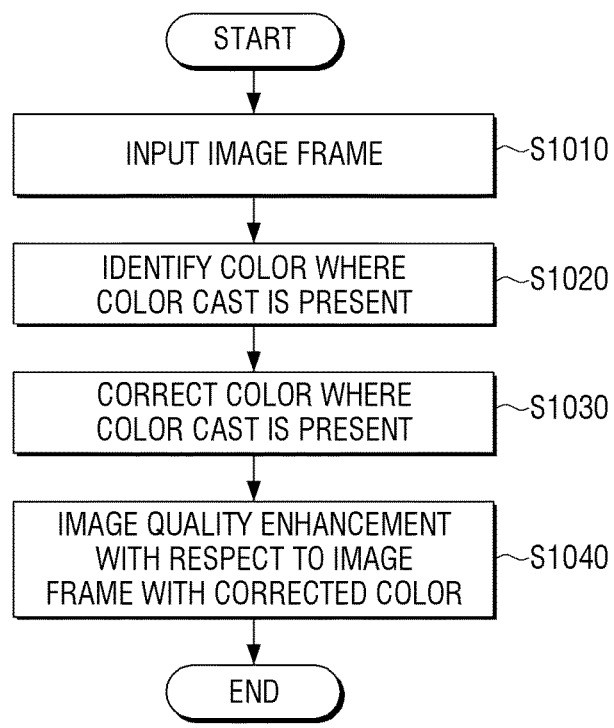
FIG. 10 is a flowchart of a method for performing image processing with respect to an image frame with enhanced image quality in a display apparatus.

FIG. 10 is a flowchart of a method for performing image processing with respect to an image frame with enhanced image quality in a display apparatus.

As described in FIG. 9, the display apparatus 100, when an image frame forming an image content is input, may analyze at least one of an illumination element and a tint element of the received image frame and determine whether color cast is present in the received image frame (S1010, S1020).

When color where color cast is present is determined in the received image frame, the display apparatus 100 performs correction of color where color cast is present in the received image frame (S1030). In the meantime, the display apparatus 100, ahead of correcting color where color cast is present in the received image frame, may determine whether to correct color where color cast is present.

According to an exemplary embodiment, the display apparatus 100, when casting intensity of color where color cast is present in the received image frame is less than a predetermined first threshold value or greater than a predetermined second threshold value, do not perform correction of color where color cast is present. Here, the first threshold value may be 0.15, and the second threshold value may be 0.7.

Through the above comparison and analysis, if it is determined that correction of color where color cast is present is performed in the received image frame, the display apparatus 100 performs color correction to reduce casting intensity of color where color cast is present to casting intensity of a predetermined level.

Therefore, when an image frame of casting intensity of color where color cast is present is generated, the display apparatus 100 performs image enhancement from the image frame (S1040). Accordingly, the received image frame, while casting intensity of color where color cast is present is reduced, may be generated as an image frame with enhanced image quality and displayed on a screen of the display apparatus 100.

In the meantime, an image processing method of a display apparatus according to various exemplary embodiments can be coded with software and stored in a non-transitory readable medium. The non-transitory readable medium can be mounted on various devices and used.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. An image processing method of a display apparatus, the method comprising:
    receiving an image frame;
    performing image quality enhancement with respect to the received image frame;
    identifying color where color cast is present by analyzing at least one of an illumination element and a tint element of the received image frame;
    identifying whether to correct the color where the color cast is present based on casting intensity of the received image frame and casting intensity of the image frame with the enhanced image quality;
    correcting the color in the received image frame where the color cast is present by using color distribution of the received image frame and color distribution of the image frame with enhanced image quality; and
    outputting the image frame having the corrected color on a screen of a display.

2. The method as claimed in claim 1, wherein the identifying the color where the color cast is present comprises:
    identifying whether a graphic is included in the received image frame; and
    in response to the graphic being included in the received image frame, identifying a color where the color cast is present using a remaining area excluding an area where the graphic is included.

3. The method as claimed in claim 1, wherein the identifying the color where the color cast is present comprises classifying the received image frame into a plurality of areas and identifying color where the color cast is present with respect to at least one area from among the plurality of areas.

4. The method as claimed in anyone of claims 1, wherein the casting intensity of the color where the color cast is present within the received image frame is computed using at least one of an illumination element and a tint element of the received image frame, and
    wherein the casting intensity of the color where the color cast is present within the image frame with the enhanced image quality is computed using at least one of an illumination element and a tint element of the image frame with enhanced image quality.

5. The method as claimed in claim 1, wherein identifying whether to correct the color where the color cast is present comprises, in response to the casting intensity of the received image frame being less than a first threshold value or greater than a second threshold value, or the casting intensity of the image frame with the enhanced image quality being less than a third threshold value or greater than a fourth threshold value, determining not to perform correction of the color where the color cast is present.

6. The method as claimed in claim 1, wherein the identifying whether to correct the color where the color cast is present comprises, in response to an estimated size of an illumination element from the received image frame being less than a predetermined first threshold value, determining not to perform correction of the color where the color cast is present.

7. The method as claimed claim 1, wherein color distribution of the received image frame and color distribution of the image frame with the enhanced image quality are composed of a two-dimensional histogram that indicates distribution of each color forming the received image frame and the image frame with the enhanced image quality.

8. The method as claimed in claim 7, wherein the correcting comprises:
   obtaining a first saturation level for the color where color cast is present within the received image frame and a second saturation level for the color where color cast is present within the received image frame with enhanced image quality, with reference to each of the histogram;
   calculating a weighted value using a difference between the obtained first saturation level and the obtained second saturation level; and
   correcting the color where color cast is present within the image frame with enhanced image quality using the calculated weighted value.

9. A display apparatus comprising:
   an image inputter configured to receive an image frame;
   an outputter configured to output an image content with respect to the image frame; and
   a processor configured to:
      in response to the image frame being input, perform image quality enhanced with respect to the received image frame according to a user command,
      identify color where color cast is present by analyzing at least one of an illumination element and a tint element of the received image frame,
      identify whether to correct the color where the color cast is present based on casting intensity of the received image frame and the image frame with enhanced image quality, and
      correct the color in the received image frame where the color cast is present by using color distribution of the received image frame and color distribution of the image frame with enhanced image quality and control the outputter to output the received image frame having the corrected color on a screen.

10. The apparatus as claimed in claim 9, wherein the processor identifies whether a graphic is included in the received image frame, and, in response to the graphic being included in the image frame, identifies a color where color cast is present using a remaining area excluding an area where the graphic is included.

11. The apparatus as claimed in claim 9, wherein the processor classifies the received image frame into a plurality of areas and identifies a color where color cast is present with respect to at least one area from among the plurality of areas.

12. The apparatus as claimed in claim 9, wherein the processor calculates casting intensity of the color where the color cast is present within the received image frame using at least one of an illumination element and a tint element of the received image frame, and calculates casting intensity of the color where the color cast is present within the image frame with enhanced image quality using at least one of an illumination element and a tint element of the image frame with enhanced image quality.

13. The apparatus as claimed in claim 9, wherein the processor, in response in response to the casting intensity of the received image frame being less than a first threshold value or greater than a second threshold value, or the casting intensity of the image frame with the enhanced image quality being less than a third threshold value or greater than a fourth threshold value, determines not to correct the color where color cast is present.

14. The apparatus as claimed in claim 9, wherein the processor determines, in response to an estimated size of an illumination element from the received image frame being less than a predetermined first threshold value, not to perform correction of the color where the color cast is present.

15. The apparatus as claimed in claim 9, wherein color distribution of the received image frame and color distribution of the image frame with the enhanced image quality are composed of a two-dimensional histogram that indicates distribution of each color forming the received image frame and the image frame with the enhanced image quality.

16. The apparatus as claimed in claim 15, wherein the processor obtains a first saturation level for the color where color cast is present within the received image frame and a second saturation level for the color where the color cast is present within the received image frame with enhanced image quality, with reference to each of the histogram, calculates a weighted value using a difference between the obtained first saturation level and the obtained second saturation level, and corrects the color where the color cast is present within the image frame with enhanced image quality using the calculated weighted value.

* * * * *